US006327577B1

United States Patent
Garrison et al.

(10) Patent No.: US 6,327,577 B1
(45) Date of Patent: Dec. 4, 2001

(54) ELECTRONIC BILL PAYMENT SYSTEM WITH ACCOUNT-NUMBER SCHEMING

(75) Inventors: David Lee Garrison, Columbus; Patricia A. Kight; Brad Perkins, both of Dublin; Cheryl Lynn Ward, Hilliard; Mary Elizabeth Lawson, Dublin; Amy Lynn Kerin, Delaware, all of OH (US)

(73) Assignee: CheckFree Services Corporation, Norcross, PA (US)

( * ) Notice: Subject to any disclaimer, the term of this patent is extended or adjusted under 35 U.S.C. 154(b) by 0 days.

(21) Appl. No.: 08/994,046

(22) Filed: Dec. 19, 1997

(51) Int. Cl.[7] .................................................. G06F 17/60
(52) U.S. Cl. ............................. 705/40; 705/35; 705/37; 705/38; 705/39
(58) Field of Search .................................. 705/40, 35, 37, 705/38, 39

(56) References Cited

U.S. PATENT DOCUMENTS

| | | | |
|---|---|---|---|
| 5,220,501 | 6/1993 | Lawlor et al. | 364/408 |
| 5,283,829 | 2/1994 | Anderson | 380/24 |
| 5,325,290 | 6/1994 | Cauffman et al. | 364/401 |
| 5,326,959 | 7/1994 | Perazza | 235/379 |
| 5,336,870 | 8/1994 | Hughes et al. | 235/379 |
| 5,383,113 | 1/1995 | Kight et al. | 364/401 |
| 5,420,405 | 5/1995 | Chasek | 235/379 |
| 5,465,206 | 11/1995 | Hilt et al. | 364/406 |
| 5,504,677 * | 4/1996 | Pollin | 705/45 |
| 5,677,955 * | 10/1997 | Doggett et al. | 705/76 |
| 5,699,528 | 12/1997 | Hogan | 395/240 |
| 5,717,868 * | 2/1998 | James | 705/35 |
| 5,727,249 | 3/1998 | Pollin | 705/40 |
| 5,781,654 * | 7/1998 | Carney | 382/137 |
| 5,920,847 * | 7/1999 | Kolling et al. | 705/40 |
| 5,920,848 * | 7/1999 | Schutzer et al. | 705/42 |
| 5,966,698 * | 10/1999 | Pollin | 705/34 |
| 6,021,202 * | 2/2000 | Anderson et al. | 380/25 |

FOREIGN PATENT DOCUMENTS

| | | | |
|---|---|---|---|
| 0 649 105 A1 * | 4/1995 | (EP) | |
| 2283588 * | 10/1995 | (GB) | |
| S63-268086 * | 4/1987 | (JP) | G06K/17/00 |
| 97/34243 * | 8/1997 | (WO) | G06F/17/60 |

OTHER PUBLICATIONS

"SSN Verifier Another Step Toward Stemming Fraud", Item Processing Report, v5, n6, Mar. 1994.*

"The Card Industry Cools Its Heels Waiting For a Fraud –Busting Code", Credit Card News, v5, n26, May 1993.*

Taylor, Jocelyn P.; "Check Fraud: Preventive Measures For Businesses"; Journal of cash Management, v21n1, pp. 34–38, Jan./Feb. 1992.*

Anonymous; Communications in managing modern payment systems; Management Accounting; Jul./Aug. 1997.*

* cited by examiner

*Primary Examiner*—V. Millin
*Assistant Examiner*—Jagdish N Patel
(74) *Attorney, Agent, or Firm*—Alfred A. Stadnicki

(57) ABSTRACT

A remittance payment method and system which receives a payor's account number with a payee, transforming it into an altered account number according to alteration rules previously stored in a merchant's database.

16 Claims, 6 Drawing Sheets

ELECTRONIC BILL PAYMENT SYSTEM WITH ACCOUNT-NUMBER SCHEMING

CROSS-REFERENCE TO RELATED APPLICATIONS

This Application is related to U.S. application Ser. No. 08/994,047, filed Dec. 19, 1997 entitled AN ELECTRONIC BILL PAYMENT SYSTEM WITH MERCHANT IDENTIFICATION, and U.S. application Ser. No. 09/994,363, filed Dec. 19, 1997, entitled AN ELECTRONIC BILL PAYMENT SYSTEM WITH ACCOUNT RANGING, which are filed simultaneously with this application.

FIELD OF THE INVENTION

The present invention relates to electronic commerce. More particularly, the present invention relates to an electronic bill payment system with account number scheming.

BACKGROUND OF THE INVENTION

It has been common for many years for consumers to pay bills by way of a personal check written by the consumer to the order of an entity and delivered to that entity by mail or in person. With the proliferation of computers interconnected to computer networks, particularly the Internet, consumers can now pay bills electronically. However until recently it was not possible for a consumer, using a computer terminal, to interact with a single payment system capable of paying all the consumer's bills whether by electronic means or by a paper check. Such a system now exists in the form of a consolidated bill payment system as described by Kight, et al. in U.S. Pat. No. 5,383,113, entitled SYSTEM AND METHOD FOR ELECTRONICALLY PROVIDING CUSTOMER SERVICES INCLUDING PAYMENT OF BILLS, FINANCIAL ANALYSIS AND LOANS.

Although the consolidated bill payment system described by Kight, et al. significantly advanced the state of the art, it did not focus on several problems which may arise in implementing a consolidated bill payment system capable of automatically paying consumer bills to merchants. One such problem is that consumers or data entry personal sometimes make mistakes in entering payment data required by the bill payment system.

Such a case arises when a consumer's account number with a merchant is incorrectly entered. The payment system must submit a correct account number to the merchant who will use this account number to associate the payment with the consumer. Thus, a technique is needed to validate the submitted consumer's account number.

A data entry person may also enter payment data which incorrectly specifies the merchant's name or parts of the merchant's address. It has been found that merchant information such as the merchant name, address, zip code are typically mangled at the data entry stage. It has been further observed that errors will often be made upon entry of the zip code. The merchant's name, address, and zip code is typically required by the payment system in order to, for example, retrieve merchant records from the merchant database. If this data is incorrect, the payment system may be unable to retrieve the correct merchant's record for processing a payment. Thus, a technique is needed to correctly identify a merchant record notwithstanding the submission of erroneous merchant data.

A consolidated bill payment system must also have the capability to properly remit payments to the same merchant at more than one remittance center. Commonly a large commercial merchant,(e.g., shoe company, Sears) will have several remittance centers distributed geographically so that customers can submit bills to a center within their location. Thus, a technique is required to ensure that consumer payments are remitted to the proper one of multiple remittance centers associated with the same.

Advantageously, a consolidated payment system must also be able to handle the different processing formats and requirements of numerous separate merchant accounting systems. For example, each merchant's account system may require payment information, such as consumer account numbers, in a format different than that submitted by the consumer. For example, many merchant accounting systems will only accept an account number with some portion of a consumer's last name or the consumer's zip code appended to the end of the account number presented by the customer.

A merchant account system may even require an altered consumer account number which uniquely identifies the consumer. For example, two consumers, e.g., spouses, may have identical account numbers, but the merchant accounting system may designate the account of each consumer uniquely, such as by combining the account number with the prospective customer's name. Additionally, it is not unusual for a merchant to have different account numbers for a single customer. For example, an account number on an invoice which goes out electronically may be different from an account number for the same customer which goes out as a paper transaction.

Thus, a consolidated bill payment system must be able to handle the various formats required by the merchant accounting system of each merchant. Accordingly, a technique is required to transform payment data received from the consumer into a form compatible with a merchant's accounting system.

OBJECTIVES OF THE INVENTION

Accordingly, it is an object of the present invention to provide a bill payment system capable of receiving bill payment data on behalf of consumers via electronic means and automatically paying their bills to merchants.

It is a further object of the present invention to provide a technique for correcting erroneous bill payment data received from customers.

It is still a further object of the present invention to provide a technique for furnishing payment information, including a payor's account number with a merchant, in a format acceptable to a particular merchant accounting system.

It is another object of the present invention to provide a technique for validating a consumer's account number with a merchant.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY OF THE INVENTION

In accordance with the present invention, an account number for a payor, typically a consumer, is received from a source and transformed into an altered account number according to previously stored alteration rules corresponding to a payee account number format. Preferably, the altered account number is then transmitted to the payee, typically a merchant, in association with a payment remitted to the payee.

The alteration rules can specify a wide variety of formats and may be realized as templates specifying fields or values, or as instructions for combining information from different fields. Typically, an altered account number is formed by combining the account number with some part of payment information or other information related to the payee. For example, the altered account number may include a portion of the payor's name, a portion of the payor's address, or a portion of the payor's zip code combined with the account number.

According to another aspect of the present invention, validation rules for the account number are stored, and a determination is made as to whether the received account number conforms with the validation rules. The validation rules identify the expected general format for any payor account number associated with a payee. Validation rules are preferably realized as templates specifying fields or values, but may take on other forms, and may even be algorithms. For example, a check digit algorithm could process the account number and compare the result to a check digit.

Typically, the present invention is realized in a programmed general computer having a storage device and a processor. The storage device is configured to store the alteration rules and the validation rules. As will be understood by those skilled in the art, the storage device may be configured in any one of many arrangements to store and manage databases, and could include a long term bulk storage configuration, such as one or more hard disks.

Preferably, the general computer is a mainframe or mini computer or high powered workstation, but could be any other processing device capable of executing programmed instructions. Additionally, the general computer could be a distributed computer system in which various aspects of the system run on different platforms. The processor of the general computer is programmed to receive payment information, including a payor account number, from a payor, preferably verify that the number conforms to the stored validation rules, alter the account number according to the stored alteration rules, and generate a signal including the altered account number to a payee in association with a payment to the payee.

The processor's programed instructions can be stored on the storage medium. This article of manufacture may be portable, a floppy disk, a hard disk, a CD Rom, or other storage medium. The processor reads the programmed instructions from the medium and in accordance therewith receives payment information including an account number for a payor, preferably verifies the account number based upon validation rules for account numbers associated with one of a plurality of payees, transforms the account number into an altered account number based upon alteration rules of the one payees, and transmits the altered account number to the payee.

Typically, a communications network couples the payor and payee to the programmed computer which processes the payment requests, allowing them to communicate and exchange data between themselves. The communications network may be of any type facilitating the flow of information among the entities, including a private network or the Internet. To process payment requests, a first station, e.g. a payor station, transmits payment information, including name, address data, and a payor's account number with one of perhaps thousands of payees and a second station, e.g. a payment processing server, receives this payment information and account number over the network. The second station then transforms the account number into an altered account number according to a format required by the applicable payee and transmits the altered account number to the payee via the network.

PREFERRED EMBODIMENT(S) OF THE INVENTION

Figure 1:
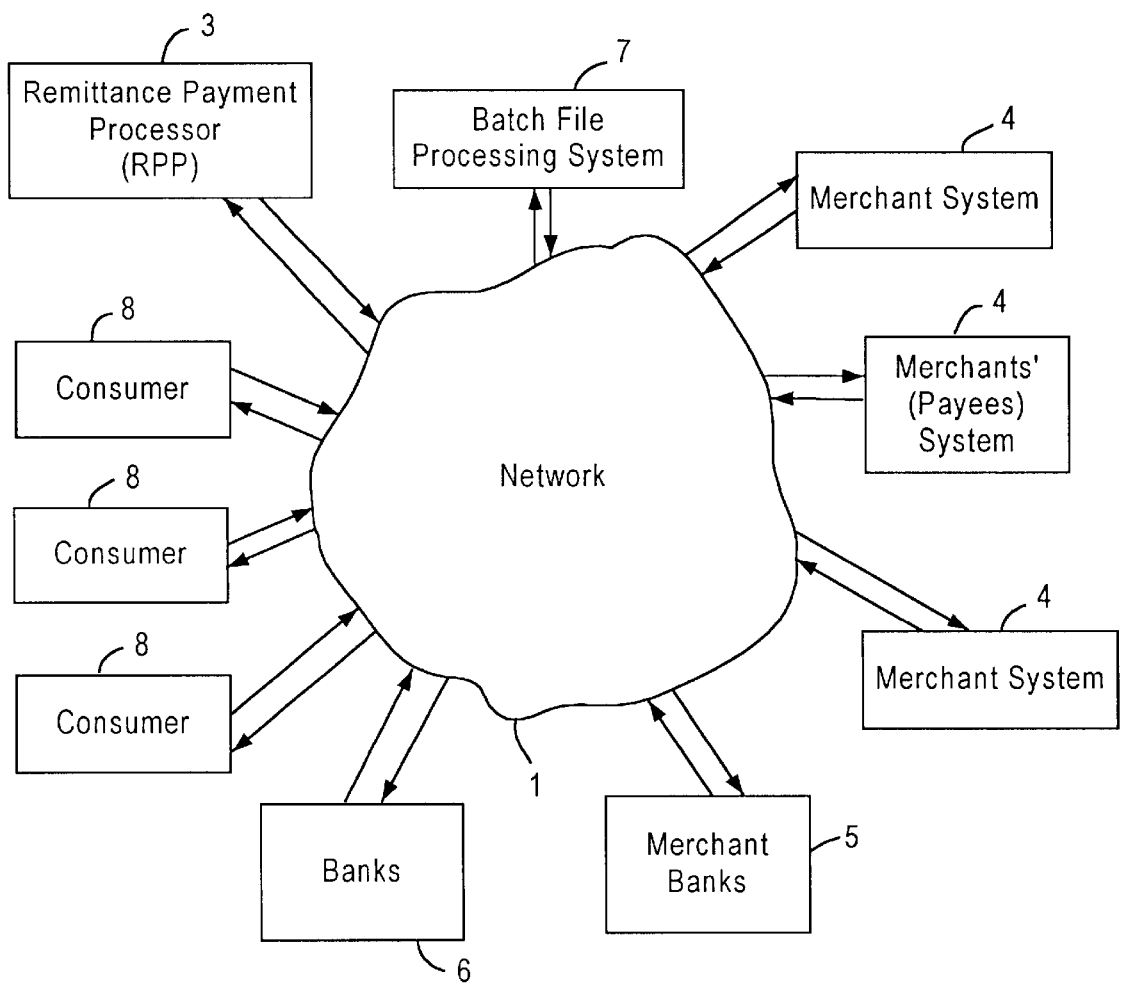
FIG. 1 is a system overview of a computerized bill payment system in accordance with the present invention.

FIG.1 generally depicts a bill payment system including consumers 8, merchants 4, a batch file processing system 7, a remittance payment processor (RPP) 3, merchant banks 5, and consumer banks 6.

A consumer, including a corporate user, (payor) is the individual or other entity for whom payments are actually made and whose account will be debited by the amount of the payment. The consumers 8 typically submit their payments electronically to batch file processing system 7. The batch file processing system 7 represents any computer or network of computers capable of collecting payment requests from the consumers 8.

Consumer banks 6 either physically or electronically holds money on account for consumers 8. These accounts are debited by the amount of any payments made on behalf of the consumers 8.

Merchants (payees) 4 are the persons or other entities to whom payments are made via the bill payment system on behalf of consumers. Merchants may include department stores, the phone company, the paper boy, a credit card company, as well as other persons and entities to whom payments are made by one or more consumers 8. Merchants have accounts with merchant banks 5.

Figure 2:
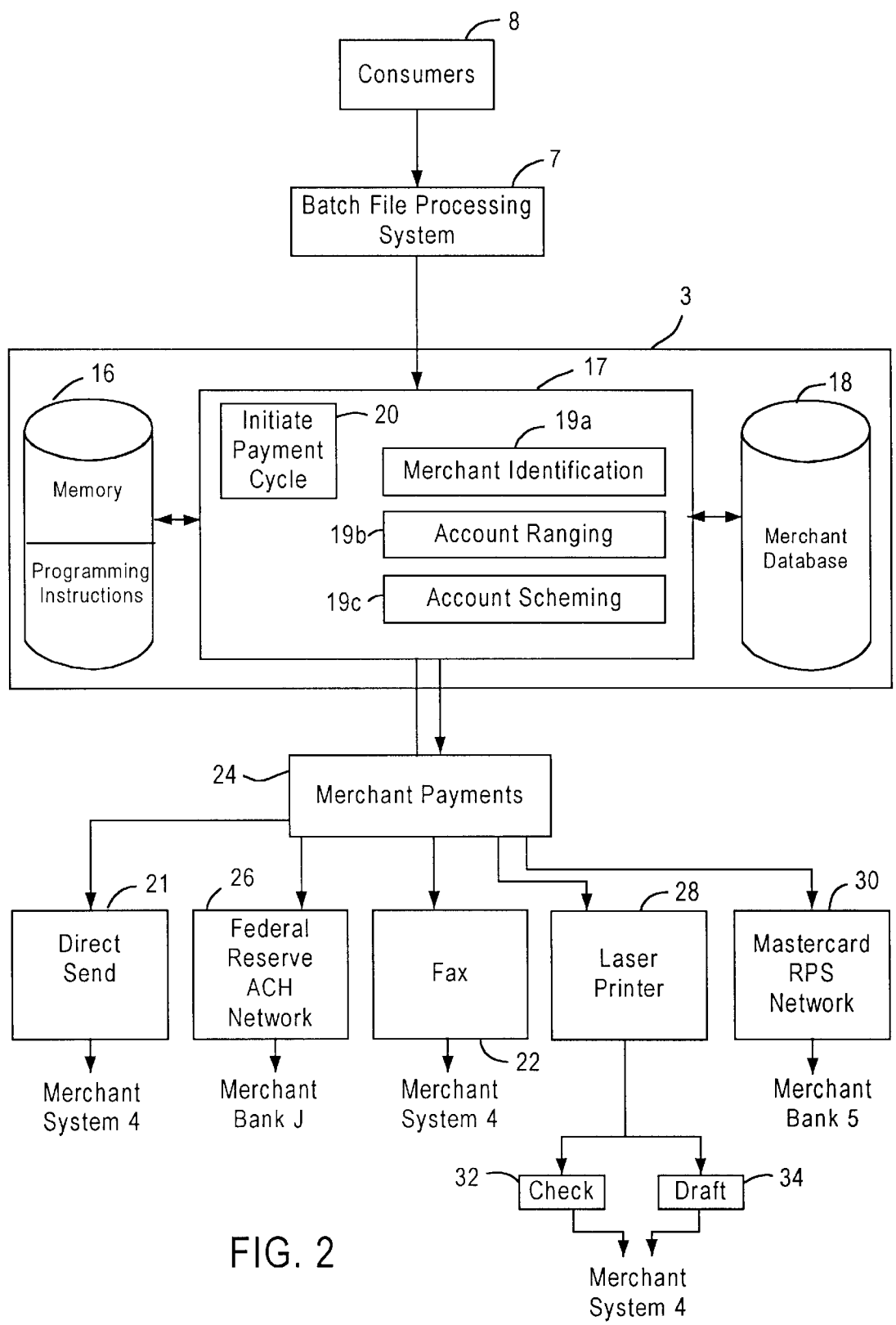
FIG. 2 is a diagrammatical representation of the remittance payment processor system of FIG. 1.

The remittance payment processor (RPP) 3, as shown in FIG. 2, includes a memory 16 storing programmed instructions for carrying out the functions of the RPP, a processor 17 for executing these instructions, and a merchant database 18 storing information associated with the merchants. A batch file processing system 7 provides payment records collected from consumers 8 and transmits the batches of records to the RPP 3.

A network 1 connects the above-stated entities making communications between them possible. The network may be of any type capable of facilitating the flow of information among the various entities. It could, for example, be a public telecommunication network, the Internet, or other type of communication network. The network 1 may also be physically realized as one or more networks. For example, in one possible embodiment, consumers 8 are coupled to batch file processing system 7 through one network and the batch file processing system is coupled to the remittance payment processor (RPP) through another separate network.

In operation, consumers 8 make payment requests electronically and these payment requests are collected by the batch file processing system 7. The batch file processing system 7 then transfers the payment requests collected from consumers 8 to the RPP 3 via the network 1. Payment information for a consumer will include several different types of information, such as the consumer account number, the merchant name, and address.

FIG. 2 illustrates an overview of the process flow within the bill payment system of RPP 3. RPP 3 receives payment information from the batch file processing system 7, processes that payment information, and passes the processed information to a component 24 which then makes payments to merchants 4. A payment is implemented by crediting a merchant's account electronically with a bank or other financial institution, or transferring a check or draft to the merchant. A payment implementation also includes sending advice to the merchant. Advice is information on a bill payment presented to a merchant electronically in a form that the merchant's system can use to process the bill payment transaction and update the merchant's records. One possible mode of payment to a merchant is electronic funds transfer through the Federal Reserve Automated Clearing House (ACH) Network 26. Another electronic payment avenue is through the MasterCard RPS Network 30. Another remittance advice delivery mode is through Fax 22. Additionally, payment can also be made non-electronically to a merchant causing laser printer 28 to print a check 32 or a draft 34. There is also a direct send 21 capability whereby the payment system sends advice to a merchant 4.

RPP 3 stores or processes several different record types necessary to the bill payment process. A merchant record contains all necessary information needed to forward a payment. This includes a merchant name, address, and zip code. A consumer record include a consumer name, address, zip code, and consumer account number. A payment record will contain information related to payment, including payee identification, consumer identification, and the dollar amount of the transaction. The merchant records are stored in a merchant database 18. All other records as well as programmed instructions which direct the operation of the RPP are stored in a memory 16. The memory 16 could also store the merchant database 18 if desired.

After receiving payment records from the batch file processing system 7, the RPP periodically initiates a payment cycle 20 which process the records to generate information which will be used to credit merchant accounts and form advice for merchant systems. The processing flow of the billing cycle contains, in addition to other processes, three particularly important processes necessary for successful processing of each payment record. These processes are merchant identification 19a, account ranging 19b, and account scheming 19c, typically performed in this order. In the first step of processing a payment record, merchant identification attempts to identify a merchant in the merchant database 18 based on information in the payment record. In the second step, the system will attempt to determine a remittance center of the merchant to which the billing information is sent. If a candidate remittance center is identified, the system enters the third stage of processing, account scheming. In account scheming, the system attempts to normalize a user account with a merchant according to the merchant's rules. If account scheming fails, the system will return to the account ranging process to attempt to identify another candidate remittance center, and from there, again into account scheming.

Although the above described payment cycle is a preferable embodiment of the RPP, a payment cycle can include the three processes of merchant identification 19a, account ranging 19b, and 19c, in any order or combination. In addition, these three processes may be performed independently, and could also be performed and packaged individually outside the RPP. These three processes will now be described in further detailed herein referring to FIGS. 3–6.

Figure 3:
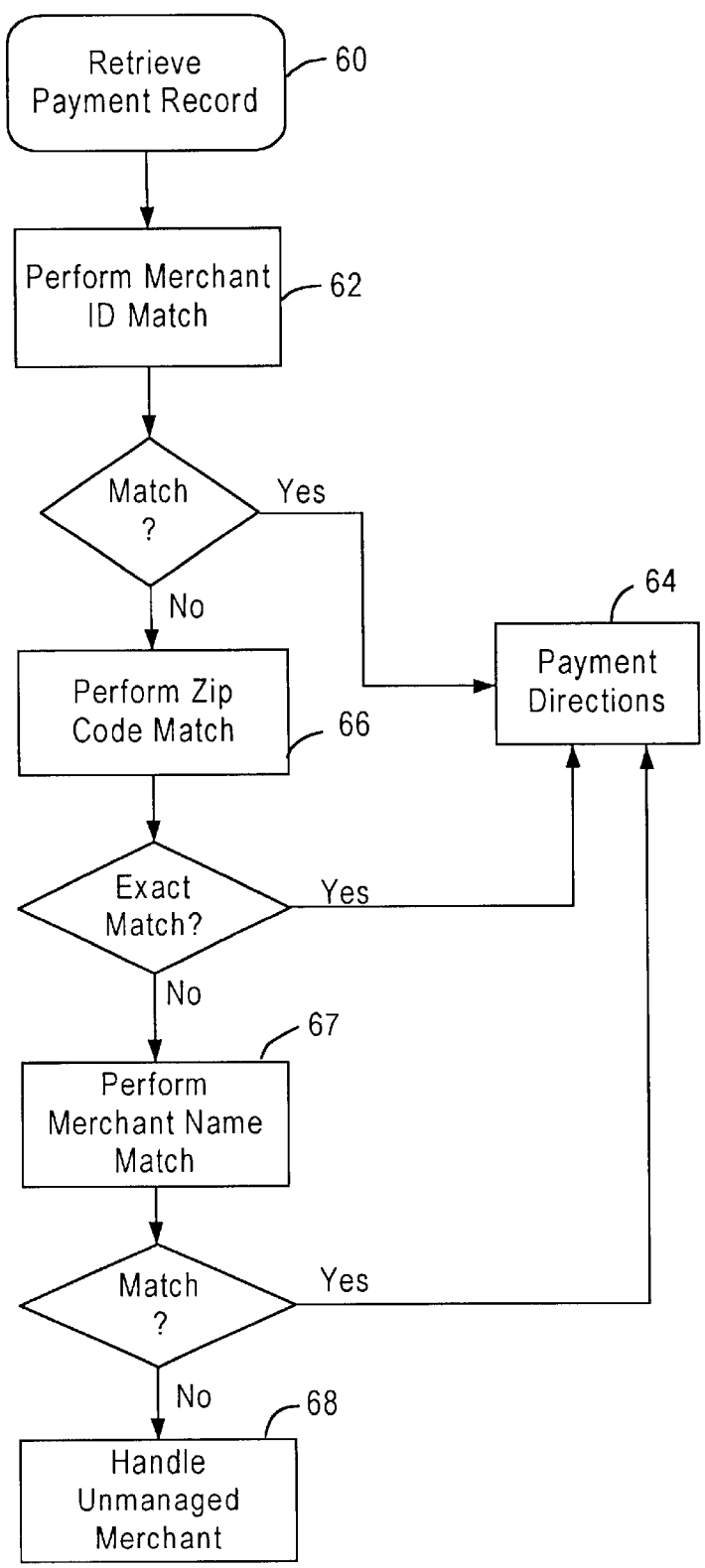
FIG. 3 is a flow chart illustrating merchant identification in accordance with the present invention.

FIG. 3 illustrates merchant identification. Using merchant identification, the RPP 3 is able to retrieve the correct merchant record from merchant database 18 based on a consumer's payment record submitted with possibly erroneous merchant name and address information, e.g., street address, city, state, zip code. It has been observed that data entry operators will often make errors in the merchant's street address and zip code. The RPP 3 is capable of mapping the mangled merchant information supplied in the payment record into the proper merchant record in the merchant database 18 notwithstanding the errors in the merchant information. Merchant identification as described herein, can be used in any implementation where merchant information is likely to contain errors and must be mapped into an existing merchant record in the merchant database.

RPP 3 initiates merchant identification by step 60 which retrieves a payment record from one of the payment records previously submitted by the batch file processing system 7. The RPP will first attempt to retrieve a merchant record from the merchant database 18 by matching the merchant id included in the payment record against the records of the merchant database 18. If this is successful, the processing of the payment record can continue to the payment directions stage 64. The payment directions stage is where the RPP determines where to send payments. This stage includes account ranging discussed below which determines the remittance center to which payment gets sent. If there is no match, the RPP continues to step 66. At step 66, the RPP maps the merchant's merchant name and address, excluding the provided street address and zip code, into an eleven digit zip code. That is, the RPP produces an eleven digit zip code based on merchant name, city, and state in the payment information. In order to avail the merchant information which the inventors have determined to be mostly likely to contain errors, the received merchant street address and zip code are not considered. Hence, in step 66 the RPP 3 identifies an eleven digit zip code based only on the merchant's name, city, and state.

Figure 4:
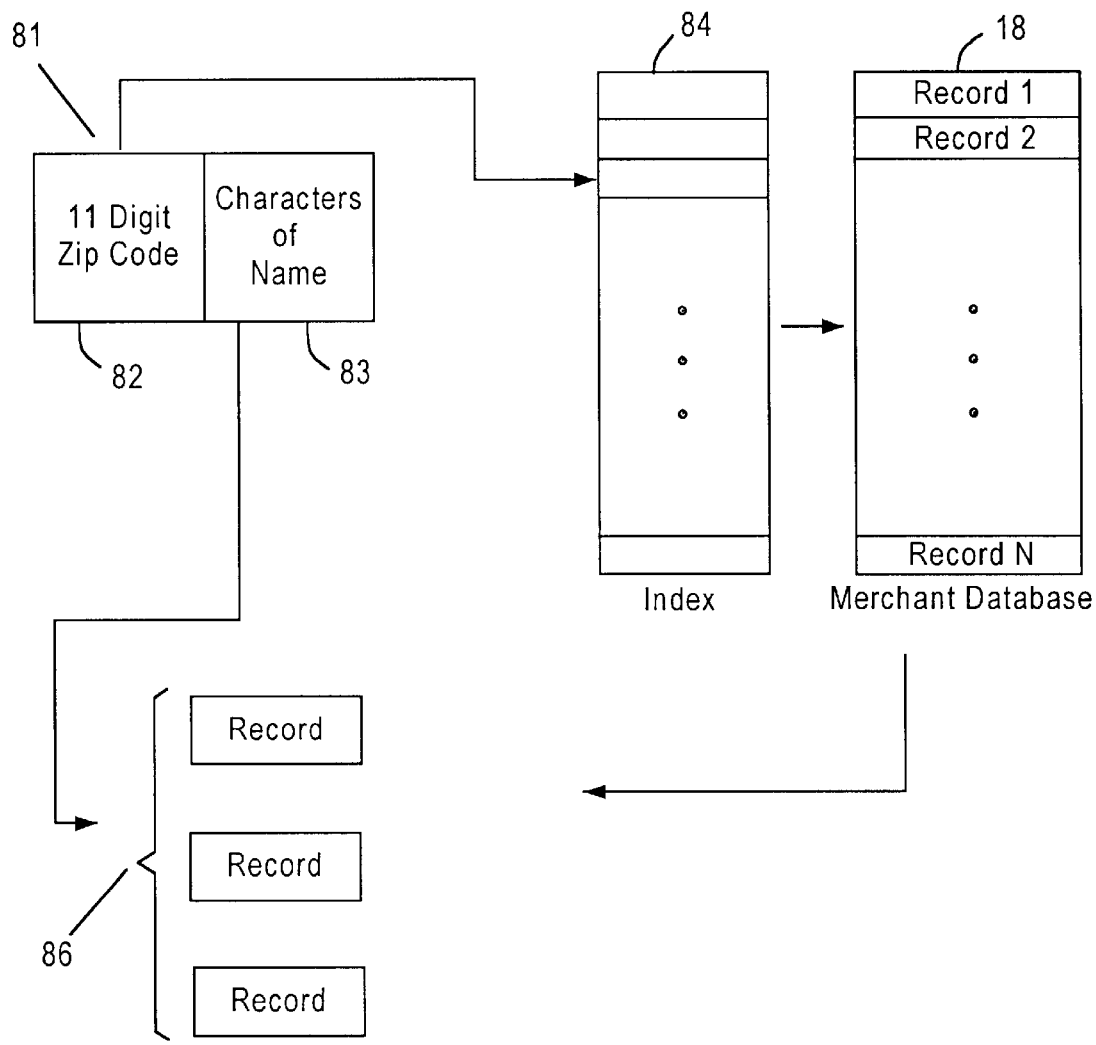
FIG. 4 is a block diagram illustrating how merchant identification accesses the merchant database.

Step 66 of merchant identification uses the indexing structure shown in FIG. 4 to access one or more records from the merchant database 18.

In step 66, the RPP 3 forms a 11 digit zip code index 82 to associating the index entry with a merchant record in merchant database 18 via index 84. It may be possible that there is more than one merchant at a location identified by an eleven digit zip code. For example, there could be a remittance processing center on the floor of the building identified by the eleven digit zip code which handles payments for several merchants 4. In such a case, the RPP differentiates the correct merchant record from other possibly correct merchant records associated with the same eleven digit zip code by, after identifying merchant records indexed to the same eleven digit zip code, comparing some portion of the merchant's name, e.g., the first five characters with the characters of each merchant's name which has been combined with the application zip code in the merchant index. The RPP 3 is thereby able to uniquely identify the proper merchant record.

If step 66 identifies a unique merchant record processing continues to step 64. However, if step 66 retrieves more than one merchant forming a group of records 86, then at step 67 the RPP 3 will attempt to match one or more characters of the merchant's name 83 against the records 86 to identify a merchant record. If a match is found, processing continues to the payment directions stage 64. If there is no match, then the RPP will handle this contingency at step 68. If there is no merchant, the system may have provisions at step 68 for adding the merchant to the merchant database 18.

Figure 5:
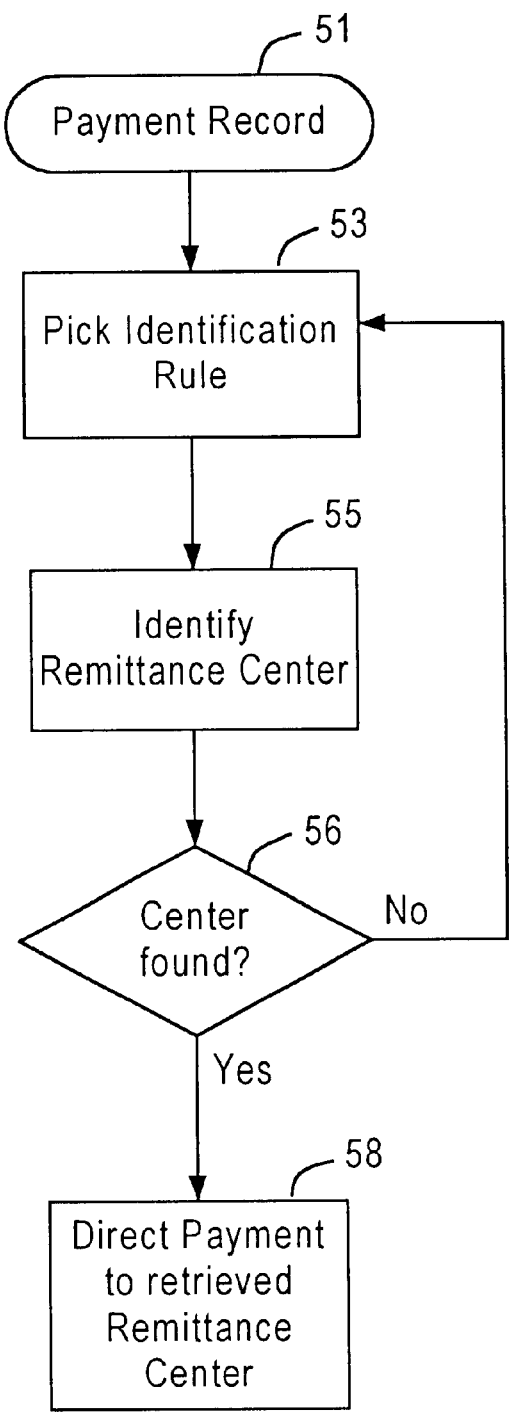
FIG. 5 is a flow chart illustrating account ranging in accordance with the present invention.

FIG. 5 illustrates a payment direction stage, as performed in the preferred embodiment of the present invention, in which the RPP attempts to determine a remittance center to which payment is sent. The RPP determines a remittance center based on one or more of the following identification rules: 1) length of account number, 2) merchant zip code, 3) merchant name, and 4) account ranging. Each rule has in common that it identifies the remittance center based on some factor of the payment information.

In FIG. 5, the RPP 3 processes the payment record presented in step 51 to determine one of a plurality of remittance centers associated with the applicable merchant in which to make payment. In step 53, the RPP chooses one of the above-mentioned four rules and at step 55 attempts to identify a remittance center. If a remittance center is found at step 56, then the RPP directs payment to that remittance center 58. If the RPP is unsuccessful in determining a remittance center, the RPP cycles back to step 53 and picks a new rule for identification. By this process, the system cycles through all combinations of rules that identify remittance centers for the merchant.

In account ranging, the correct remittance center is determined based on some characteristic of the consumer's account number. Typically a large merchant, such as credit card company will have multiple remittance centers to which respective consumer payments must be submitted. The payment record contains information which may be used to identify a remittance center besides an account number, such as an area code of the payor's telephone number. A telephone phone utility might include each consumer's area code in the consumer's account number and require payments from all consumers within a particular area code be directed to a particular one of multiple remittance centers. A credit card company may require that payments from all consumers having the same first six digits in their account numbers be made to the same remittance center.

The payment direction process illustrated in FIG. 5 is a preferred embodiment for determining payment direction. In this embodiment, the payment direction process includes account ranging as one of four possible methods of identifying a remittance center. However, in other embodiments, account ranging may be used in different combinations, or independently.

Figure 6:
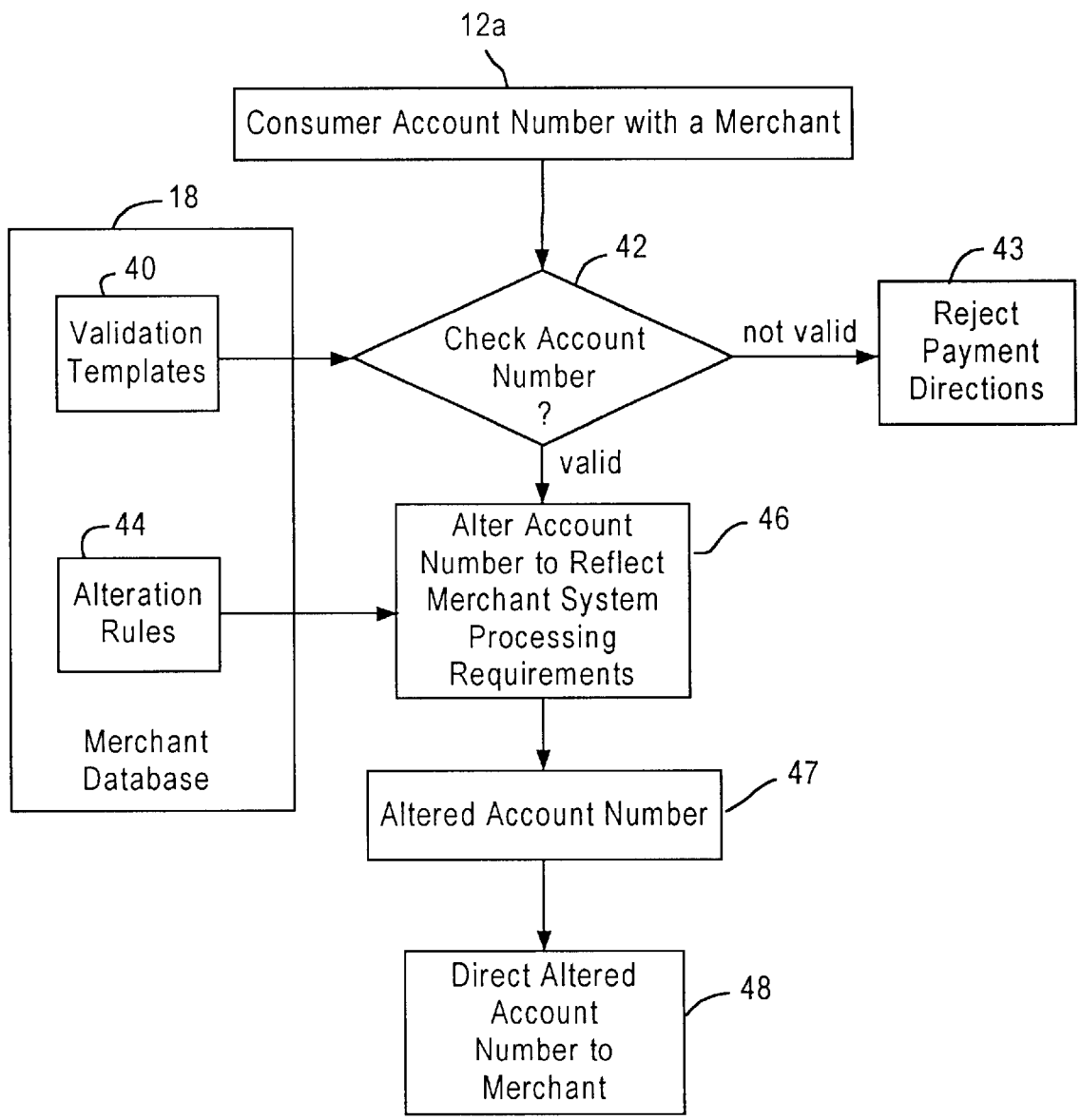
FIG. 6 is a flow chart illustrating account scheming in accordance with the present invention.

FIG. 6 illustrates the steps for account scheming. In certain cases, the consumer account number received by the RPP as part of the payment information may contain errors. Hence, the RPP has no way of checking the account number against a previously stored account number associated with the applicable consumer to verify the accuracy of the received information.

Using account scheming, the RPP receives, in step 12a, the consumer account number as part of the payment record.

In step 42, the RPP checks to validate the account number. Then in step 46, the RPP alters the account number to correspond to a format required by a merchant's system 4 for processing.

More particularly, the RPP validates and alters the consumer account number by storing separate business rules for each merchant which identify the expected general format for any consumer account number associated with that merchant. These business rules are stored as validation templates 40 in merchant database 18 for each merchant. The account number received from the consumer is checked against the validation template to validate that the account number conforms to the general account number format to which an account number associated with the applicable merchant must conform. For example, the validation template for a merchant such as a credit card company may require an account number begin with the numbers "43" and be 18 digits long. Additionally, for some merchants the validation template will have check digit requirements. That is, the validation template can be used to confirm that the received consumer account number conforms to a check digit after being run through a specific algorithm.

In operation, the RPP 3 performs, in accordance with programmed instructions stored on the memory 16, the validation procedure by comparing in step 42 the received consumer account number for the applicable merchant received in step 12a with the validation template, say 40, for that merchant to test the validity of the account number. If that account number is not valid, the payment directions are rejected as not valid in step 43; otherwise, the account number is considered valid.

Once the account number has been validated, it is then modified in step 46 so as to conform to alteration rules 44 for the applicable merchant. The alteration rules 44 are also stored in database 18. The alteration rules 44 relate to the format of the consumer's account number in which the applicable merchant system requires to process a consumer's payment. Typically, alteration rules would specify an altered account number which includes a portion of a payor's name with the account number, a portion of the payor's address with the account number, or a portion of the payor's zip code with the account number. Alteration by the RPP 3 involves notifying the received account number which will be furnished, along with payment, to the merchant. For instance, some merchant systems require that the consumer's account number always end in "120". Hence, in such a case, the RPP 3, in accordance with programmed instructions stored on the memory 16, modifies the received account number to append "120" to the end of the alphanumeric sequence of the received account number. Once the account number has been modified so as to conform to the format required by the merchant system, the altered account number 47 is then transmitted from the RPP 3 to the merchant 4 via the network 1, along with the payment, in step 48.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, e.g. a bill payment system, those skilled in the art will recognize that its usefulness is not limited thereto and that the present invention can be beneficially utilized in any number of environments and implementations. Accordingly, the claims set forth below should be construed in view of the full breadth and spirit of the invention as disclosed herein.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. A computer-based method of altering an account number associated with payment remittance, comprising:

receiving an account number for a payor;

storing alteration rules corresponding to a payee account number format; and transforming the received account number into an altered account number according to the alteration rules;

wherein the altered account number includes one of a portion of the payor's name, a portion of the payor's address, and a portion of the payor's zip code.

2. The method of claim 1, wherein:

the altered account number includes the portion of the payor's name.

3. The method of claim 1, wherein:

the altered account number includes the portion of the payor's address.

4. The method of claim 1, wherein:

the altered account number includes the portion of the payor's zip code.

5. A system for altering an account number associated with payment remittance, comprising:

a storage device configured to store validation rules corresponding to values for fields of payee account numbers and alteration rules corresponding to a payee account number format; and a processor configured to:
receive payment information, including a payor account number, from a payor,
verify that the number conforms to the stored validation rules;
alter the account number according to the stored alteration rules, and
generate a signal including the altered account number to a payee in association with a payment to the payee;

wherein the altered account number includes one of a portion of the payor's name, a portion of the payor's address, and a portion of the payor's zip code.

6. The system of claim 5, wherein:

the altered account number includes the portion of the payor's name.

7. The system of claim 5, wherein:

the altered account number includes the portion of the payor's address.

8. The system of claim 5, wherein:

the altered account number includes the portion of the payor's zip code.

9. An article of manufacture for processing payment information, comprising:

computer readable storage medium; and a computer program stored on the storage medium, wherein the stored computer program is configured to be readable from the computer readable storage medium by a computer and thereby cause the computer to operate so as to:
receive payment information including an account number for a payor;
verify the account number based upon validation rules for account numbers associated with one of a plurality of payees;
transform the account number into an altered account number based upon alteration rules of the one payee; and
transmit the altered account number to the payee;

wherein the altered account number includes one of a portion of the payor's name, a portion of the payor's address, and a portion of the payor's zip code.

10. The article of manufacture of claim 9, wherein:

the altered account number includes the portion of the payor's name.

11. The article of manufacture of claim 9, wherein:

the altered account number includes the portion of the payor's address.

12. The article of manufacture of claim 9, wherein:

the altered account number includes the portion of the payor's zip code.

13. A system for processing payment information, comprising:

a communications network;

a first station coupled to the network and configured to transmit payment information, including name, address data, and a payor's account number with one of a plurality of payees via the network;

a second station, coupled to the network and configured to receive the payment information from the first station via the network, transform the account number into an altered account number according to a format required by the one payee, and transmit the altered account number to the payee via the network;

wherein the altered account number includes one of a portion of the payor's name, a portion of the payor's address, and a portion of the payor's zip code.

14. The system of claim 13, wherein:

the altered account number includes the portion of the payor's name.

15. The system of claim 13, wherein:

the altered account number includes the portion of the payor's address.

16. The system of claim 13, wherein:

the altered account number includes the portion of the payor's zip code.

* * * * *

UNITED STATES PATENT AND TRADEMARK OFFICE
CERTIFICATE OF CORRECTION

PATENT NO. : 6,327,577 B1
DATED : December 4, 2001
INVENTOR(S) : Garrison et al.

Page 1 of 1

It is certified that error appears in the above-identified patent and that said Letters Patent is hereby corrected as shown below:

<u>Title page,</u>
[73] Assignee: CheckFree Services Corporation
Norcross, GA (US)

Signed and Sealed this

Twenty-first Day of May, 2002

Attest:

Attesting Officer

JAMES E. ROGAN
*Director of the United States Patent and Trademark Office*